(12) United States Patent
Zillner

(10) Patent No.: US 11,175,648 B2
(45) Date of Patent: Nov. 16, 2021

(54) METHOD AND APPARATUS FOR PROVIDING AN INSTANTIATED INDUSTRIAL SEMANTIC MODEL FOR AN INDUSTRIAL INFRASTRUCTURE

(71) Applicant: Siemens Aktiengesellshaft, Munich (DE)

(72) Inventor: Sonja Zillner, Munich (DE)

(73) Assignee: SIEMENS AKTIENGESELLSCHAFT

(*) Notice: Subject to any disclaimer, the term of this patent is extended or adjusted under 35 U.S.C. 154(b) by 269 days.

(21) Appl. No.: 16/297,897

(22) Filed: Mar. 11, 2019

(65) Prior Publication Data

US 2019/0286109 A1 Sep. 19, 2019

(30) Foreign Application Priority Data

Mar. 13, 2018 (EP) ..................................... 18161497

(51) Int. Cl.
*G05B 19/418* (2006.01)
*G06F 16/908* (2019.01)
*G05B 23/02* (2006.01)

(52) U.S. Cl.
CPC ..... *G05B 19/4183* (2013.01); *G05B 19/41885* (2013.01); *G05B 23/0251* (2013.01); *G06F 16/908* (2019.01); *G05B 23/0264* (2013.01)

(58) Field of Classification Search
None
See application file for complete search history.

(56) References Cited

U.S. PATENT DOCUMENTS 10,678,195 B2* 6/2020 Vartak .............. G05B 19/41875
2010/0192660 A1* 8/2010 Kurz ........................ B21B 37/28
72/365.2

(Continued)

FOREIGN PATENT DOCUMENTS

WO 2016045734 A1 3/2016
WO WO 2016/045734 3/2016

(Continued)

OTHER PUBLICATIONS

European Search Report dated Sep. 11, 2018 for Application No. 18161497.5.

*Primary Examiner* — Kim T Nguyen
(74) *Attorney, Agent, or Firm* — Schmeiser, Olsen & Watts LLP

(57) ABSTRACT

Provided is an apparatus and method for providing an instantiated industrial semantic model, iISM, for an industrial infrastructure having data generation components, the apparatus including: an interface unit adapted to receive from an industrial infrastructure data generated by data generation components provided within the industrial infrastructure, a context management unit adapted to derive types of data generation components provided within the industrial infrastructure depending on characteristics of the received data and adapted to map each derived type of data generation component to an associated context model specified in the industrial semantic model, ISM, stored in a repository, and an instantiating unit adapted to instantiate the stored industrial semantic model, ISM, with predefined industrial instance models, IIMs, of data generation components on the basis of the mapped context models to generate the instantiated industrial semantic model, iISM, of the industrial infrastructure.

15 Claims, 4 Drawing Sheets

(56) References Cited

U.S. PATENT DOCUMENTS

| | | | |
|---|---|---|---|
| 2011/0022442 A1* | 1/2011 | Wellman | G06Q 10/06 |
| | | | 705/7.36 |
| 2016/0274553 A1* | 9/2016 | Strohmenger | G05B 17/02 |
| 2016/0274558 A1* | 9/2016 | Strohmenger | G05B 19/0428 |
| 2016/0274978 A1* | 9/2016 | Strohmenger | G06F 11/1458 |
| 2017/0316061 A1 | 11/2017 | Thomas et al. | |
| 2018/0181112 A1 | 6/2018 | Lingyun et al. | |
| 2019/0133392 A1* | 5/2019 | Rolland | A47L 9/242 |
| 2019/0377929 A1* | 12/2019 | Lundahl | G06K 9/0002 |

FOREIGN PATENT DOCUMENTS

| | | |
|---|---|---|
| WO | 2017007479 A1 | 1/2017 |
| WO | WO 2017/007479 | 1/2017 |

* cited by examiner

METHOD AND APPARATUS FOR PROVIDING AN INSTANTIATED INDUSTRIAL SEMANTIC MODEL FOR AN INDUSTRIAL INFRASTRUCTURE

CROSS-REFERENCE TO RELATED APPLICATIONS

This application claims priority to European application No. 18161497.5, having a filing date of Mar. 13, 2018, the entire contents of which are hereby incorporated by reference.

FIELD OF TECHNOLOGY

The following relates to a method and apparatus for providing an instantiated industrial semantic model for an industrial infrastructure having data generation components such as a manufacturing facility.

BACKGROUND

An industrial infrastructure can comprise a wide variety of different infrastructures, in particular plants or any other kinds of complex industrial systems or legacy systems. These legacy systems can be complex systems comprising a plurality of subsystems and software and/or hardware components. The industrial infrastructure can comprise legacy systems having several machines including hardware and/or software components. The industrial infrastructure can for instance comprise gas turbines of a power plant. Industrial facilities in general require proper maintenance. Maintenance helps to reduce operating costs and improves the productivity and performance of the industrial infrastructure. In many applications, remote service centers are used to provide maintenance for industrial infrastructures, in particular for power plants. Service centers are used to monitor and perform diagnosis for a plurality of applications for components of the industrial infrastructure including gas and steam turbines, generators or compressors. Accordingly, service engineers can receive a huge amount of notifications about potential issues or real failures of any one single component or application within the industrial infrastructure or facility. In a conventional system, the service engineer may start to manually investigate all related databases within the existing IT architecture in order to finally trigger an action addressing the notified issue or failure. Most of the service engineer's time is normally spent for gathering data in large and comprehensive but unfortunately siloed data sets within the existing system.

For each of those legacy systems, a customized query needs to be formulated. Further, joints are required to provide a comprehensive diagnostic result for the respective industrial infrastructure or legacy system. Due to the large number of existing installed legacy systems, this may lead to a large number of complex queries. Consequently, addressing issues of failures within a complex legacy system is very time-consuming. Moreover, manpower, attention and specific technical know-how is required in order to secure a proper and continuing operation of the industrial infrastructure.

SUMMARY

An aspect relates to a method and apparatus that allows a seamless integration and an easy access to large-scale industrial data provided by entities of an industrial infrastructure.

The following provides according to the first aspect a method for providing an instantiated industrial semantic model for an industrial infrastructure having data generation components, wherein the method comprises the steps of:
receiving data from a specific industrial infrastructure generated by data generation components provided within the specific industrial infrastructure,
deriving types of data generation components provided within the specific industrial infrastructure depending on characteristics of the received data,
mapping each derived type of data generation component to an associated context model specified in the industrial semantic model stored in a repository and
instantiating the stored industrial semantic model with predefined industrial instance models of data generation components on the basis of the mapped context models to generate the instantiated industrial semantic model of the specific industrial infrastructure.

An idea underlying the method according to the first aspect of embodiments of the present invention is to make use of external and/or internal predefined knowledge models to automatically guide a mapping of existing legacy data provided by the industrial infrastructure forming the legacy system to an application-related knowledge graph.

The knowledge graph can make use of background and domain knowledge formalized as semantic data models.

The method according to the first aspect of embodiments of the present invention allows to automate the data access to data provided by data generation components within an industrial infrastructure or legacy system. The method makes use of knowledge data models providing for collecting, condensing and semantically connecting of unrelated data sources or data silos. In a possible embodiment, the abstraction layer can be implemented as an application focused knowledge graph. The knowledge graph can define relevant concepts and relations and makes sure that existing data sets or data items are mapped on the corresponding meta concepts.

In a possible embodiment of the method according to the first aspect of the present invention, a similarity of data received from a data generation component with other previously received data is determined and used to derive a type of the data generation component.

Different kinds of similarity metrics can be used to determine the similarity between the data received from a data generation component with other previously received and stored data.

In a possible embodiment of the method according to the first aspect of the present invention, the stored context model of a component of the industrial infrastructure comprises relations of the respective component to other components of the industrial infrastructure.

In a further possible embodiment of the method according to the first aspect of the present invention, for each component of the industrial infrastructure, an associated industrial instance model is stored in the repository.

In a further possible embodiment of the method according to the first aspect of the present invention, the received data comprise data items including data sets with time series data.

In a further possible embodiment of the method according to the first aspect of the present invention, the received data comprise data items including log files with event sequences.

In a further possible embodiment of the method according to the first aspect of the present invention, meta data captured in the context of a component are extracted automatically from unstructured data items.

In a further possible embodiment of the method according to the first aspect of the present invention, meta data captured in the context of a component are loaded from structured data items received from the respective component.

In a still further possible embodiment of the method according to the first aspect of the present invention, the meta data captured in the context of a component are stored in the repository along the instantiated instance model of the component.

In a still further possible embodiment of the method according to the first aspect of the present invention, the meta data comprise relevant context information about a type and/or function of the component as well as the relations of the component to other components of the industrial infrastructure.

In a still further possible embodiment of the method according to the first aspect of the present invention, data entries of data items received from a component of the industrial infrastructure are checked to determine whether they are in or outside a normal predefined value and/or time range.

In a still further possible embodiment of the method according to the first aspect of the present invention, the data generation components provided in the industrial infrastructure comprise heterogeneous data sources, in particular sensors, controllers and local memories which transmit the generated data via a network and/or network cloud infrastructure to the repository and/or to a data access execution engine accessible via API and/or a user interface.

In a still further possible embodiment of the method according to the first aspect of the present invention, data items received from a component are labelled with semantic annotations using meta data captured in the context of the respective component.

The embodiments further provides according to a second aspect an apparatus for providing an instantiated industrial semantic model for an industrial infrastructure.

The embodiments provides according to the second aspect an apparatus for providing an instantiated industrial semantic model for an industrial infrastructure having data generation components,
the apparatus comprising:
an interface unit adapted to receive from an industrial infrastructure data generated by data generation components provided within the industrial infrastructure,
a context management unit adapted to derive types of data generation components provided within the industrial infrastructure depending on characteristics of the received data and adapted to map each derived type of data generation component to an associated context model specified in the industrial semantic model stored in a repository and
an instantiating unit adapted to instantiate the stored industrial semantic model with predefined industrial instance models of data generation components on the basis of the mapped context models to generate the instantiated industrial semantic model of the respective industrial infrastructure.

In a further possible embodiment of the apparatus according to the second aspect of the present invention, the context management unit is adapted to determine a similarity of data received from a data generation component with other previously received data to derive the type of the respective data generation component.

In a still further possible embodiment of the apparatus according to the second aspect of the present invention, the context model of a component stored in the repository comprises relations of the respective component to other components of the industrial infrastructure.

In a still further possible embodiment of the apparatus according to the second aspect of the present invention, for each type of a component of the industrial infrastructure, an associated industrial instance model is stored in the repository.

BRIEF DESCRIPTION

Some of the embodiments will be described in detail, with references to the following Figures, wherein like designations denote like members, wherein.

DETAILED DESCRIPTION

Figure 1:
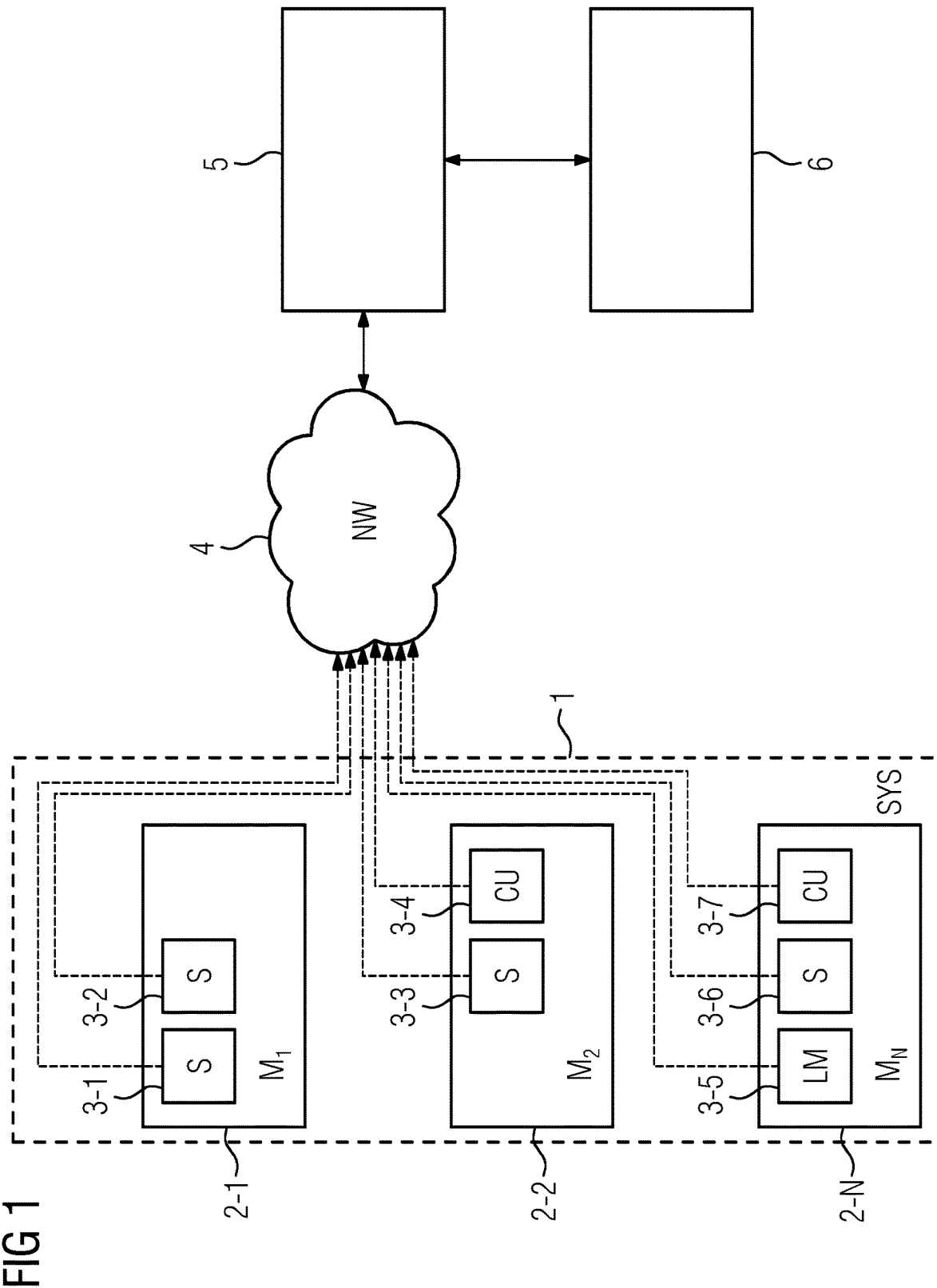
FIG. 1 shows a schematic block diagram for illustrating a possible exemplary embodiment of a system using the method for providing an instantiated industrial semantic model for an industrial infrastructure having data generation components according to the first aspect of embodiments of the present invention.

As can be seen in the schematic diagram, an industrial infrastructure for a legacy system 1 may comprise in the illustrated example a number of subsystems or machines 2-1, 2-2, 2-n each having one or more data generation components 3. In the illustrated example of FIG. 1, the legacy system is a manufacturing system having N subsystems or machines to manufacture a product. The industrial infrastructure can also be for instance a power plant having different subcomponents or power generation components equipped with data generation components. The data generation components 3 can comprise for example sensor units, control units or local memories of the different subsystems or machines. In the illustrated example of FIG. 1, a first machine 2-1 of the legacy system 1 has two data generation components 3-1, 3-2 formed by sensors provided at components of the subsystem 2-1. Further, the second machine or subsystem 2-2 of the manufacturing system 1 illustrated in FIG. 1 comprises as a first data generation component a sensor 3-3 and a local control unit 3-4 generating monitoring data for the processes executed in the second subsystem 2-2. Further, the Nth subsystem 2-n comprises in the illustrated example of FIG. 2 as data generation components a local memory 3-5, a sensor 3-6 and a control unit 3-7 of the respective subsystem 2-n. Each subsystem 2-i can comprise a plurality of different kinds of data generation components each providing a stream of data items which is supplied via a network or network cloud infrastructure 4 to an execution engine 5 having access to a repository stored in a database 6.

In the illustrated embodiment of FIG. 1, the data items provided by the data generation components are supplied to the execution engine 5 which may store the received data in the repository of the database 6. In an alternative embodiment, the data items received from the industrial infrastructure system 1 can also be loaded first up into the repository stored in the database 6 for further processing by the execution engine 5. The execution engine 5 has access to the repository stored in the database 6 and can receive data from at least one legacy system 1 as shown in FIG. 1. The execution engine 5 can receive data from a number of different legacy systems for further processing. The execution engine 5 can comprise one or more processors for pre-processing the received data. The data received from a specific industrial infrastructure or legacy system 1 as shown in FIG. 1 can be received by the execution engine 5 which derives automatically types of data generation components 3-$i$ within the specific industrial infrastructure 1 depending on characteristics of the received data. The received data can comprise data items including data sets with time series data and/or log files with event sequences. From the received data items, an application executed on the execution engine 5 can derive automatically types of the different data generation components 3-$i$ within the industrial infrastructure 1 on the basis of the characteristics of the received data. The characteristics can comprise different parameters of the received data stream or data packets. For instance, the data can comprise data sets with time series data consisting of data samples. The values of the data samples and/or the frequency of the received time series data samples form characteristics of a data generation component. Further, the data samples of the time series data may comprise an average or stochastic distribution characteristic for the respective data. Also, a value range of the data samples may be characteristic for the data component having generated the data samples. The received data to be processed by an application within the execution engine 5 can also comprise event sequences provided by log files transmitted to the execution engine 5. The event sequences can comprise a sequence of events E1, E2 ... $E_m$ which are characteristic for a specific data generation component 3-$i$. Depending on the characteristics of the received data, the types of data generation components 3 can be derived by an application executed by the execution engine 5. For instance, it can be derived that a sensor 3-$i$ is a temperature sensor or a pressure sensor. Further, it may be derived whether the received data or data stream originates from a local memory, a sensor or from a control unit of the legacy system 1. Each derived type of data generation component is then mapped to an associated context model CM specified in an industrial semantic model ISM stored in the repository. Further, the stored industrial semantic model ISM is instantiated with predefined industrial instance models IIMs of data generation components on the basis of the mapped context models CMs to generate the instantiated industrial semantic model ISM of the specific industrial infrastructure or legacy system 1. Each context model CM of a component of the industrial infrastructure comprises relations r of the respective component to other components of the industrial infrastructure. For example, a relation r may be that component A is connected to component B or that component A forms part of component B. A further example of a relation r is that a component is arranged on the left side of another component. Another possible relation r is that the component is located close to another component within the system 1 or subsystem 2. Accordingly, the relations r describes the context of a component within a system or subsystem of the legacy system 1. For each component of the industrial infrastructure 1, an associated industrial instance model IIM is stored in the repository of the database 6. The data received from the industrial infrastructure 1 can comprise structured data items and/or unstructured data items. In a possible embodiment, meta data captured in the context of a component can be extracted from unstructured data items or loaded from structured data items. The meta data can be stored in the repository along the instantiated instance model of the respective component. The meta data can comprise relevant context information about a type and/or function of the component as well as the relations of the component to other components of the industrial infrastructure 1.

In a possible embodiment, data entries of data items received from a component of the industrial infrastructure 1 can be checked to determine whether they are in or outside a predefined normal value and/or time range. Data items found to include abnormal values or being outside a normal time range can be in a possible embodiment filtered and/or discarded for further processing.

The different data generation components 3-$i$ provided in the industrial infrastructure 1 comprise heterogeneous data sources, in particular sensors, controllers and local memories. These heterogeneous sensor sources transmit the generated data via a network 4 and/or a network cloud infrastructure to the repository and/or to the data execution engine 5 which can be accessible via API or a user interface. In a possible embodiment, the data items received from a component can be labelled with semantic annotations using meta data captured in the context of the respective component.

Figure 2:
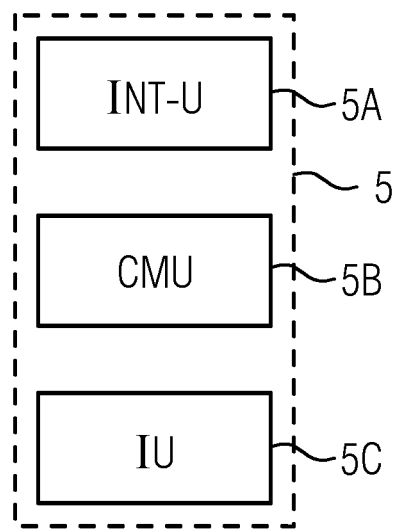
FIG. 2 shows a schematic block diagram of a possible exemplary embodiment of an apparatus for providing an instantiated industrial semantic model for an industrial infrastructure having data generation components according to embodiments of the second aspect of the present invention.

FIG. 2 shows a block diagram of a possible exemplary embodiment of an apparatus 5 for providing an instantiated industrial semantic model ISM for an industrial infrastructure 1 according to the second aspect of embodiments of the present invention. The apparatus illustrated in FIG. 2 can be implemented on a data access execution engine 5 as illustrated in FIG. 1. In the illustrated exemplary embodiment, the apparatus 5 comprises an interface unit 5A, a context management unit 5B and an instantiating unit 5C. The interface unit 5A is adapted to receive from the industrial infrastructure 1 data generated by data generation components 3-$i$ provided within the industrial infrastructure 1. The context management unit 5B is adapted to derive types of data generation components provided within the industrial infrastructure 1 depending on characteristics of the received data. The context management unit 5B is further adapted to map each derived type of data generation component 3-$i$ to an associated context model CM specified in the industrial semantic model ISM stored in the repository.

The instantiating unit 5C of the apparatus 5 is adapted to instantiate the stored industrial semantic model ISM with predefined industrial instance models IIM of data generation components 3-$i$ on the basis of the mapped context models CM to generate the instantiated industrial semantic model iISM of the respective industrial infrastructure 1.

Figure 3:
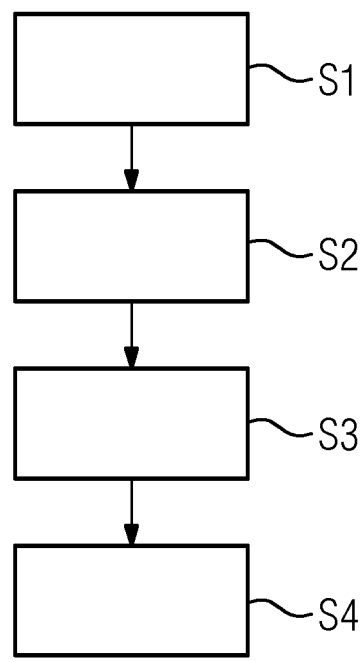
FIG. 3 shows a flowchart of a possible exemplary embodiment of a method for providing an instantiated industrial semantic model for an industrial infrastructure having data generation components according to the first aspect of embodiments of the present invention.

FIG. 3 shows a flowchart of a possible exemplary embodiment of a method for providing an instantiated industrial semantic model iISM for an industrial infrastructure 1 having data generation components 3-$i$ according to the first aspect of embodiments of the present invention. In the illustrated embodiment, the method comprises four main steps. The method illustrated in FIG. 3 can be executed in a possible implementation by a data access execution engine 5 as illustrated in FIGS. 1, 2.

As can be seen in FIG. 3, in a first step S1, data is received from a specific industrial infrastructure 1 wherein the data has been generated by data generation components 3-$i$ provided within the respective industrial infrastructure 1.

In a further step S2, types of data generation components 3-$i$ provided within the industrial infrastructure 1 are derived automatically depending on data characteristics of the data received in step S1. In a possible embodiment, a similarity of data received from a data generation component 3-$i$ with other previously received and stored data is determined and used to derive automatically the type of the respective data generation component 3-$i$.

In a further step S3, each derived type of data generation components is mapped by a context management unit 5B to an associated context model CM specified in the industrial semantic model ISM stored in the repository.

In a further step S4, the stored industrial semantic model ISM is instantiated with predefined industrial instance models of data generation components on the basis of the mapped context models CM to generate the instantiated industrial semantic model iISM of the specific industrial infrastructure 1.

Figure 4:
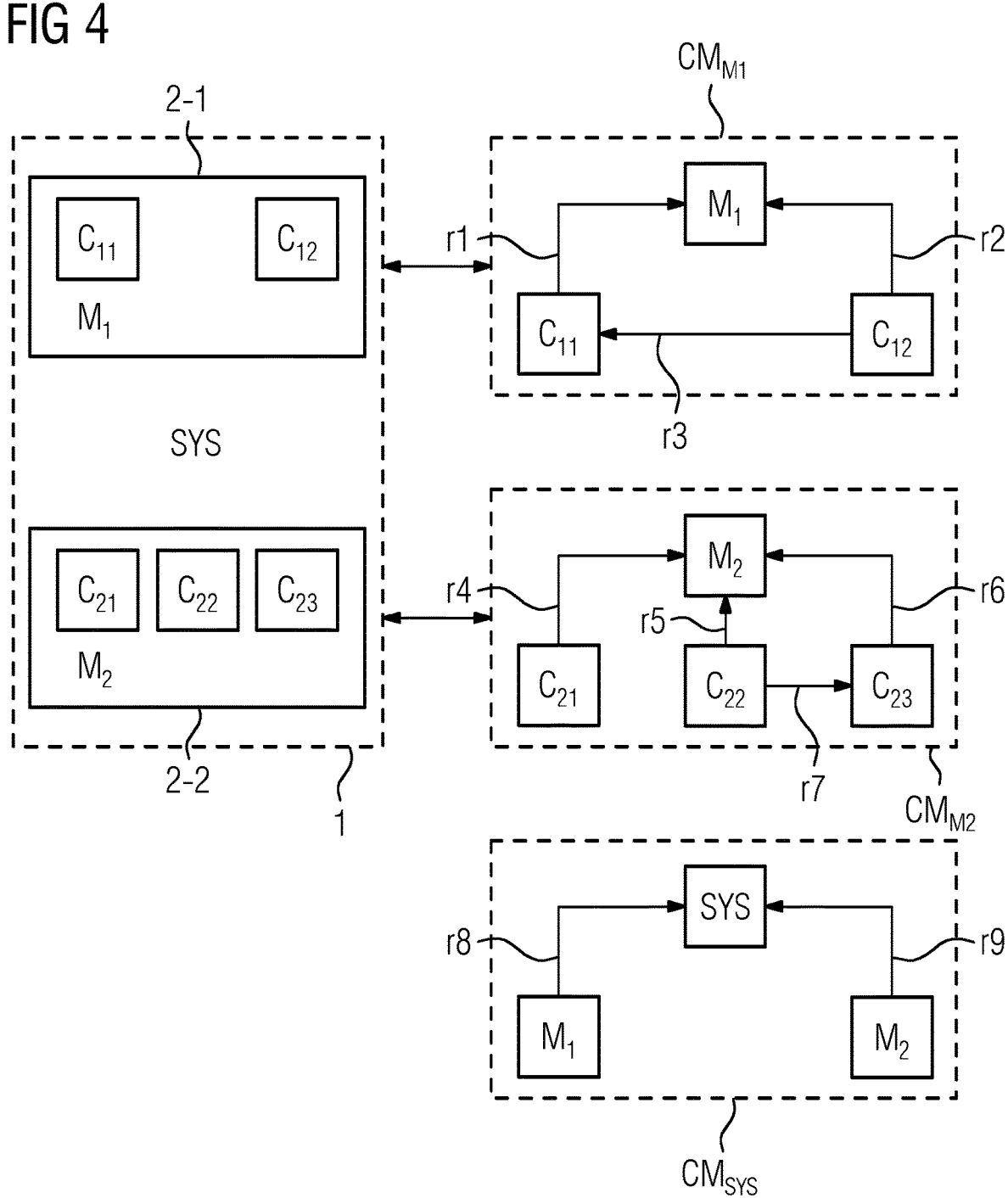
FIG. 4 shows exemplary context models for components within an industrial system to illustrate the operation of a method and apparatus according to embodiments of the present invention.

FIG. 4 shows a simple example for illustrating context models CM used by the method and apparatus 5 according to embodiments of the present invention for generating an instantiated industrial semantic model iISM of a specific industrial infrastructure or legacy system 1. In the illustrated simple example, the legacy system 1 comprises two subsystems or machines 2-1, 2-2. Both subsystems 2-1, 2-2 can comprise a plurality of hardware and/or software components. Some of the components of the machine or subsystem 2-1, 2-2 form data generation components 3-$i$ such as sensors, local memories or control units. In the illustrated example of FIG. 4, the first machine 2-1 of the legacy system 1 comprises two data generation components $C_{11}$, $C_{12}$ whereas the second subsystem or machine 2-2 comprises three data generation components $C_{21}$, $C_{22}$, $C_{23}$. In the repository of the database 6, associated corresponding context models CM can be stored. The corresponding context models CM are illustrated in FIG. 4. In the given example, the first context model CM for the first machine 2-1 indicates that the components $C_{11}$, $C_{12}$ are part of the machine M1 as expressed by corresponding relations r1, r2. Accordingly, the relations r1, r2 may comprise the logic relation "part of". In the illustrated simple example of FIG. 4, between the data generation components $C_{11}$, $C_{12}$, also relations can exist. For instance, the relation r3 illustrated in FIG. 4 may indicate that the data generation component $C_{12}$ is arranged on the right side of the data generation component $C_{11}$.

Further, the second context model of the second subsystem 2-2 of the legacy system 1 can indicate that the components $C_{21}$, $C_{22}$ and $C_{23}$ all form parts of the machine 2-2. Accordingly, the relations r4, r5, r6 can be "part of" relations. In the illustrated example, there is no relation between components $C_{21}$ and component $C_{22}$. In the given example, there is a relation between the second data generation component $C_{22}$ of subsystem 2-2 and the third component $C_{23}$ of subsystem 2-2. For example, relation r7 may be that the second data generation component $C_{22}$ of the second machine 2-2 is located close to the third component $C_{23}$ of the same machine.

The third context model CM is the context model of the whole legacy system indicating that machines 2-1, 2-2 both form part of the legacy system 1. Accordingly, the relations r8, r9 can also be "part of" relations.

In the illustrated exemplary embodiment of FIG. 4, the components of each context model CM comprise data generation components 3-$i$. In a further possible embodiment, the context models CM may also comprise relations with other hardware and/or software components of the subsystem 2 not forming data generation components 3-$i$. For example, other components may also have an impact on the data generation function and/or data generation capabilities of data generation components 3-$i$. Consequently, in a possible embodiment, also the context of data generation components 3-$i$ with respect to other components can be captured by the context model CM. Between two components of the context model CM, there can be one or more relations r. The relations r form logic predefined relations.

For each derived type of data generation component, an associated context model CM is specified in the industrial semantic model ISM stored in the repository.

Figure 5:
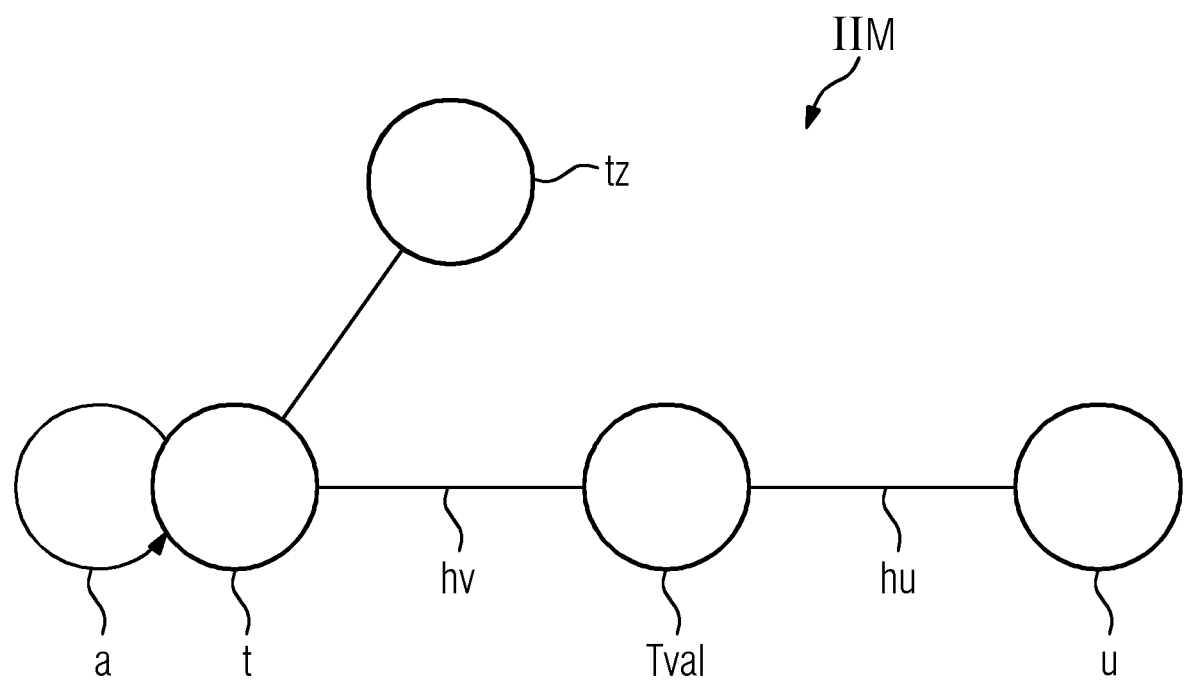
FIG. 5 shows an example of an industrial instance model of a temperature sensor forming a data generation component.

For each type of data generation component, there exists an associated predefined industrial instance model IIM of the respective data generation component 3-$i$. An example is illustrated in FIG. 5 for a temperature sensor. For instance, if the data generation component 3-$i$ is found on the basis of the data characteristics of the data generated by the component 3-I to be e.g. a temperature measurement sensor, the associated predefined industrial instance model IIM can be loaded from the repository and used for instantiating the stored industrial semantic model ISM. The predefined industrial instance model IIM of a data temperature sensor can for instance have the structure as illustrated in FIG. 5. At a time point t belonging to a time zone tz, the sensor 3 may provide a temperature value $T_{val}$ with a specific temperature unit u such as Celsius, Fahrenheit or Kelvin. In the illustrated example of FIG. 5, the time point coming after the previous time point (a) has as a relation "has value" (hv) to the measured temperature value $T_{val}$. The temperature value has as a relation "has unit" (hu) as shown in FIG. 5 to the node "unit" (u). For instance, if it is found that the component $C_{11}$ is with a high probability a temperature sensor because of the data characteristics of the data received from the respective component, the associated industrial instance model IIM for such a temperature sensor as illustrated in FIG. 5 can be used for instantiating the industrial semantic model ISM of the legacy system 1. For each component type of the industrial infrastructure 1, an associated industrial instance model IIM is stored in the repository. The generated instantiated industrial semantic model iISM of the specific industrial infrastructure 1 can be further processed in response to queries formulated by a service engineer. The built instantiated industrial semantic model iISM is stored in the repository in association with the investigated system 1 and can be used to generate replies for received queries. The instantiated industrial semantic model iISM forms a complex knowledge graph encoding information which can be extracted in response to a query input into the data access execution engine 5. The queries can be formulated on a logical level. Given the information stored and/or encoded in the knowledge graph of the instantiated industrial semantic model iISM of the industrial infrastructure system 1, the querying of a large number of heterogeneous service data silos can be automatically integrated and output in a possible implementation in a visualized graph on a display of apparatus 5. This can lead to significant time savings for the service engineer. The instantiated industrial semantic model iISM can be used to speed up the data pre-processing in the context of data analytic applications.

The method according to embodiments of the present invention ensures a consistent representation of semantics of data received from heterogeneous data sources of an industrial system 1. The heterogeneous data sources or data generation components 3-*i* can be enriched by meta data enabling a transparent management of the data in accordance to the data information requirements of the application context. The method according to embodiments of the present invention as illustrated in the flowchart of FIG. 4 ensures that data originating from heterogeneous data generation components 3-*i* can be merged and integrated in a conceptual and logical manner to provide an instantiated industrial semantic model which can be further processed for subsequent high-level applications such as analytical processing applications or advanced monitoring and diagnostic applications. The method and apparatus according to embodiments of the present invention provides a seamless access to heterogeneous industrial data sources by ensuring that semantics of each data item relevant for a particular application context are captured and processed in a formal and automated manner.

The knowledge repository stored in the database 6 of the system 1 can encompass an integrated industrial semantic model ISM which forms the basis to process data from heterogeneous industrial data sources in an integrated manner. The integrated industrial semantic model ISM can also comprise context models CMs adapted to describe for each component of interest its context to other components. In particular, a part-of relationship or a part of relationship can be used to formalize the context model CM.

Beside the generic industrial semantic model ISM, the semantic model can further comprise a set of industrial instance models IIMs. An industrial instance model IIM forms an instance of the industrial semantic model ISM encompassing the data items and related meta data captured in the context of one particular component. In case of industrial applications being composed of many more simple applications or components, the industrial instance model ISM may include the industrial instance models IIM of all its components enhanced by the information how those components relate to each other.

The knowledge repository may further comprise a set of related domain ontologies and standards which can be used for aligning relevant background knowledge, defining constraints of data sets or used for semantic labelling of the industrial data sources.

The knowledge repository can be stored in any kind of storage component or database. The storage component can be formed in a possible embodiment by a cloud platform that encompasses the knowledge repository. In case that data entries cannot be transferred to the storage component or database but have to stay in its original location (e.g. due to privacy concerns, largeness of data, etc.) dedicated meta data describing the storage location of the respective data entry can be enhanced by the information of how to access the data entry and can be added to the industrial semantic model ISM.

A data source connector implemented on the execution engine 5 can be provided to enable a standardized way for semantic labelling of structured and unstructured data sources. The execution engine 5 can comprise a context management unit 5B which can be provided to ensure that all uploaded data items are stored in the particular context they refer to. In industrial settings, such contexts can comprise either applications such as a gas turbine monitoring system, a component of a larger system of e.g. compressor and/or a single device such as a sensor. The context management unit 5B can extract any information of the uploaded data sources indicating to which context/application, component or device a particular data item or data set is referring to and may link this meta data to the particular industrial instance model IIM. The particular information about the context of each application or component is described in the associated context model CM.

If a data item is represented in a structured format, a schema analytics component may translate the underlying data structure of the data item into the data structure of the industrial instance model. This can be accomplished by identifying similar data schema elements as a basis to make either the user or the machine proposals of data structure mappings to the industrial and semantic model as well as corresponding semantic annotation. Similar data schema elements can be identified in a possible embodiment by comparing the data structure of a newly uploaded data source with the data structures of all already stored component instance data. For example, if a time series data of a vibration sensor is uploaded to the database or storage component, the transferred data items (i.e. the time series data) are mapped and stored in the context of the vibration sensor. This data can be accompanied by meta data explaining to which system/application in which function this particular vibration sensor is referring to. The transferred data items can be mapped and stored in the context of the vibration sensor in a similar meta structure as defined by already uploaded data from other vibration sensors. To enable a high quality and reliability of data sources or data generation components 3, the schema analytics component can include a user interaction process step for verification of data schema mappings and semantic annotations.

If a data item cannot be transferred or uploaded to the storage component or database 6, a data storage locater may extract in a possible embodiment meta data characterizing the data item. The meta data describing a storage location of the data item is stored and adds both meta data to the respective industrial semantic model. The data item may not be transferred or uploaded to the repository for different reasons including data privacy, largeness of data or high velocity or frequency of generated data.

In a further possible embodiment, the semantic labelling component can be implemented on the execution engine 5. The semantic labelling component can comprise algorithms and tools enabling a standardized way of extracting and semantic labelling of information for unstructured data items. In accordance to the type of input data (e.g. image, text, type of report) and a minimum set of meta data informing the system about relevant context information—such as type and function of system or application, its relation to other components and the overall production—the extracting and semantic labelling of the unstructured data item can be accomplished as following. For each type of unstructured data items (image, text, etc.), a dedicated set of information extraction algorithm can be available that extracts meaningful entities of the input data items. For example, NLP algorithms can be used to extract information related to downtimes of industrial assets from received log files. The extracted meta data can be stored in the context of the respective industrial instance model IIM.

In a still further possible embodiment, the execution engine 5 can comprise an implemented abnormality checking unit. Data entries of data items received from a component of the industrial infrastructure 1 are checked to determine whether they are in or outside a normal value and/or time range. The abnormality checking unit implemented on the execution engine 5 can encompass algorithms and tools enabling a standardized way to indicate how to interpret captured information and data and/or data entries. For instance, by relying on physical or chemical or related background knowledge represented in a formally manner, an algorithm can infer whether a data entry is in a normal range or outside a normal range representing an abnormality. The assessment of abnormal values and ranges can also be applied on combinations of data entries and/or time sequences.

In a possible embodiment, an initializing phase is provided. In the initializing phase, new data content can be uploaded into the storage component or repository. The selection of data sources that are intended to be uploaded into the storage component can be performed. The selection of data sources or data generation components 3-$i$ can be accomplished by means of a user or machine via a dedicated API.

The context mapper or management unit of the execution engine 5 can ensure that any information or data item relevant for a particular application or component is linked to the associated context model CM in the industrial instance model. If the data item is in structured format, the schema analytics components can map the original data sources for data generation components 3-$i$ to the industrial semantic model ISM by providing meta data explicating the context of the data item. By means of a set of similarity measures or metrics, the context mapping unit 5B is adapted to automatically decide whether similar data schemas have already been uploaded in the storage component or repository.

If this is the case, the uploaded data is enhanced with the corresponding meta data of the identified data schemata having a high calculated similarity.

In contrast, if no similar data schemata have been identified the system may make a proposal of how to extend the industrial semantic model ISM with additional concepts, relationships and its corresponding mapping to the respective data item. In accordance with reliability requirements of the application, this step can be implemented in an automated manner (machine provided proposal) or with some degree of user interaction (interface asks the user to prioritize or select between various mapping options).

The semantic labelling component can semantically label all newly integrated unstructured data items. The semantic labelling component can process all newly uploaded, unstructured data items by using an appropriate IE algorithm. In a second usage phase, seamless access to industrial data on a conceptual and logical manner is possible.

The data access execution engine 5 can be accessed via API or a user interface. The data access execution engine 5 provides means to query the content of interest by specifying structured query requests, determining a data scope of interest by specifying the parameters and categories. The structured query request can be similar to SPARQL queries.

The method and apparatus 5 according to embodiments of the present invention allow to integrate and define a seamless integration of various data sources or data generation components 3-$i$. The method and system 1 provide means for extracting structural meta data of industrial assets, such as part-of relationships, that make the structural interdependencies of industrial data explicit.

The method according to embodiments of the present invention provides a process for uploading industrial data from legacy systems 1 to an abstraction layer that ensures standardized representation of structured and unstructured data content. The method provides access to data on a conceptual and logical manner. The method and apparatus 5 according to embodiments of the present invention provides means for extracting and interpreting meaningful information entities captured in unstructured data sources in a standardized way.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for providing an instantiated industrial semantic model, iISM, for an industrial infrastructure having data generation components,
wherein the method comprises the steps of:
   (a) receiving data from a specific industrial infrastructure generated by data generation components provided within the specific industrial infrastructure;
   (b) deriving types of data generation components provided within the specific industrial infrastructure depending on characteristics of the received data;
   (c) mapping each derived type of data generation component to an associated context model specified in the industrial semantic model, ISM, stored in a repository; and
   (d) instantiating the stored industrial semantic model, ISM, with predefined industrial instance models, IIMs, of data generation components based on the mapped context models to generate the instantiated industrial semantic model, iISM, of the specific industrial infrastructure.

2. The method according to claim 1, wherein a similarity of data received from a data generation component with other previously received data is determined and used to derive the type of the data generation component.

3. The method according to claim 1, wherein the stored context model of a component of the industrial infrastructure comprises relations of the respective components to other components of the industrial infrastructure.

4. The method according to claim 1, wherein for each component of the industrial infrastructure, an associated industrial instance model, IIM, is stored in the repository.

5. The method according to claim 1, wherein the received data comprise data items including data sets with time series data and/or log files with event sequences.

6. The method according to claim 5, wherein meta data captured in the context of a component are extracted from unstructured data items or loaded from structured data items received from the respective component.

7. The method according to claim 6, wherein the meta data captured in the context of a component are stored in the repository along the instantiated instance model, IIM, of the component.

8. The method according to claim 6, wherein the meta data comprise relevant context information about at least one of a type and function of the component and the relations of the component to other components of the industrial infrastructure.

9. The method according to claim 6, wherein data entries of data items received from a component of the industrial infrastructure are checked to determine whether they are in or outside a normal value and/or time range.

10. The method according to claim 1, wherein the data generation components provided in the industrial infrastructure comprise heterogeneous data sources, including sensors, controllers and local memories which transmit the generated data via a network and/or network cloud infrastructure at least one of to the repository and to a data access execution engine accessible via API or a user interface.

11. The method according to claim 6, wherein data items received from a component are labelled with semantic annotations using meta data captured in the context of the respective component.

12. An apparatus for providing an instantiated industrial semantic model, iISM, for an industrial infrastructure having data generation components,
the apparatus comprising:
an interface unit adapted to receive from an industrial infrastructure data generated by data generation components provided within the industrial infrastructure,
a context management unit adapted to derive types of data generation components provided within the industrial infrastructure depending on characteristics of the received data and adapted to map each derived type of data generation component to an associated context model specified in the industrial semantic model, ISM, stored in a repository, and
an instantiating unit adapted to instantiate the stored industrial semantic model, ISM, with predefined industrial instance models, IIMs, of data generation components based on the mapped context models to generate the instantiated industrial semantic model, iISM, of the industrial infrastructure.

13. The apparatus according to claim 12, wherein the context management unit is adapted to determine a similarity of data received from a data generation component with other previously received data to derive the type of the respective data generation component.

14. The apparatus according to claim 12, wherein the context model of a component stored in the repository comprises relations of the respective component to other components of the industrial infrastructure.

15. The apparatus according to claim 12, wherein for each type of a component of the industrial infrastructure an associated industrial instance model, IIM, is stored in the repository.

* * * * *